US012609984B2

(12) United States Patent
Matsuo et al.

(10) Patent No.: US 12,609,984 B2
(45) Date of Patent: Apr. 21, 2026

(54) INFORMATION PROCESSING DEVICE, INFORMATION PROCESSING METHOD, AND PROGRAM

(71) Applicant: NTT, Inc., Tokyo (JP)

(72) Inventors: Kazuya Matsuo, Musashino (JP); Masaru Takagi, Musashino (JP); Ryota Nakada, Musashino (JP); Koya Mori, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/012,747

(22) PCT Filed: Jun. 24, 2020

(86) PCT No.: PCT/JP2020/024800
§ 371 (c)(1),
(2) Date: Dec. 23, 2022

(87) PCT Pub. No.: WO2021/260839
PCT Pub. Date: Dec. 30, 2021

(65) Prior Publication Data
US 2023/0254365 A1      Aug. 10, 2023

(51) Int. Cl.
*H04L 67/1008* (2022.01)
*H04L 47/2425* (2022.01)
*H04L 67/12* (2022.01)

(52) U.S. Cl.
CPC ...... *H04L 67/1008* (2013.01); *H04L 47/2433* (2013.01); *H04L 67/12* (2013.01)

(58) Field of Classification Search
CPC . H04L 67/1008; H04L 47/2433; H04L 67/12; G06F 9/50
See application file for complete search history.

(56) References Cited

U.S. PATENT DOCUMENTS

2015/0215738 A1* 7/2015 Frusina ................ H04N 21/422
455/552.1
2018/0261020 A1* 9/2018 Petousis ............... G07C 5/0841
2019/0371085 A1 12/2019 Kishikawa et al.
2020/0255026 A1* 8/2020 Katardjiev ....... G08G 1/096741
2022/0075563 A1* 3/2022 Kishida ................ G06F 3/0647
2022/0084328 A1 3/2022 Kishikawa et al.

FOREIGN PATENT DOCUMENTS

JP         2002157233      5/2002
JP         2016018295      2/2016
JP         2018190124      11/2018
JP         2020095503 A    6/2020
JP         WO2019142458 A1 11/2020

* cited by examiner

*Primary Examiner* — Shirley X Zhang
(74) *Attorney, Agent, or Firm* — XSENSUS LLP

(57) ABSTRACT

An information processing device 1 of the present embodiment includes a sensor data collection unit 12 configured to receive sensor data from a sensor device 4, a priority setting unit 13 configured to set, when the sensor data is received, a priority for the sensor data based on a surrounding situation of the sensor device 4, and an execution location determination unit 14 configured to determine a logic group 2 or 3 that is to process the sensor data based on the priority.

12 Claims, 5 Drawing Sheets

Fig. 2

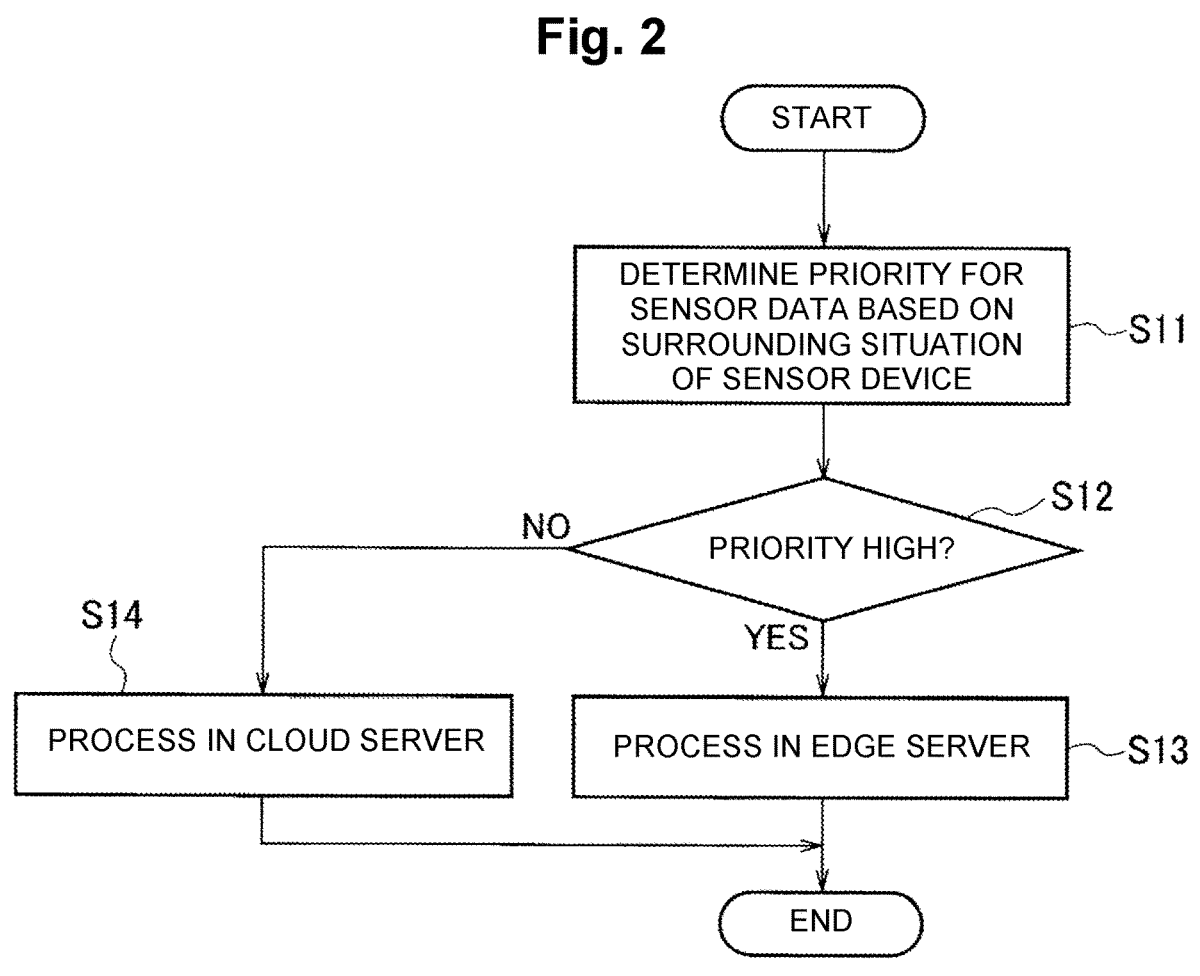

START

DETERMINE PRIORITY FOR
SENSOR DATA BASED ON
SURROUNDING SITUATION
OF SENSOR DEVICE — S11

S12

NO ← PRIORITY HIGH?

YES

S14

PROCESS IN CLOUD SERVER

PROCESS IN EDGE SERVER — S13

END

INFORMATION PROCESSING DEVICE, INFORMATION PROCESSING METHOD, AND PROGRAM

CROSS-REFERENCE TO RELATED APPLICATIONS

This application is a National Stage application under 35 U.S.C. § 371 of International Application No. PCT/JP2020/024800, having an International Filing Date of Jun. 24, 2020, the disclosure of which is considered part of the disclosure of this application, and is incorporated by reference in its entirety into this application.

TECHNICAL FIELD

The present invention relates to an information processing device, an information processing method, and a program.

BACKGROUND ART

In recent years, along with spread of IoT (Internet of Things), various familiar devices have been connected to the Internet. In accordance with this, an application located on a cloud server and an IoT device have been caused to work together. Accordingly, even a terminal having inferior arithmetic capability is being able to perform complex processing such as a data analysis or an operational change according to an analysis result.

Meanwhile, along with an increase in the number of IoT devices, the volume of data transmitted to the cloud server is increased, and an increase in network costs and an increase in load on the application on the cloud server are becoming problems. In addition, a low latency processing response is important for an application, such as a connected car or an industrial robot, that requires remote control of the IoT devices. However, if a physical distance between the cloud server and the IoT device is long, occurrence of a communication delay is unavoidable, and therefore there is a limit in nature to reduction in a response delay.

Against such a background, edge computing is attracting attention in which a server is deployed in a surrounding part (edge) of a network (hereinafter, which is referred to as an edge server), and a part of an application is arranged on the edge server. According to the edge computing, it is possible to realize distribution of data which has been concentrated on the cloud server and speeding-up of the response to the terminal. If a processing group (hereinafter, referred to as a logic) of the application which frequently communicates with a user or a terminal is arranged on the edge server, a response time from the application can be shortened, for example.

CITATION LIST

Patent Literature

Patent Literature 1: JP 2018-190124 A

SUMMARY OF THE INVENTION

Technical Problem

According to the edge computing, since servers are distributed and arranged in a plurality of sites, a computer resource per site is decreased. Although the number of sensor devices that can be accommodated in one site is small, it is difficult to cope with fluctuation of the load amount by static load leveling.

Therefore, if the number of sensor devices connected to a particular edge server site is suddenly increased or the volume of data to be processed is suddenly increased, a processing delay caused by pending may occur due to a resource shortage of the edge server.

The present invention is devised in view of the above problems, and an object of the present invention is to more efficiently use a resource of a server while requirements on a sensor device are satisfied.

Means for Solving the Problem

An information processing device of an aspect of the present invention includes a sensor data collection unit configured to receive sensor data from a sensor device, a priority setting unit configured to set, when the sensor data is received, a priority for the sensor data based on a surrounding situation of the sensor device, and an execution location determination unit configured to determine a processing device that is to process the sensor data based on the priority.

An information processing method of an aspect of the present invention includes the steps of: receiving sensor data from a sensor device, setting, when the sensor data is received, a priority for the sensor data based on a surrounding situation of the sensor device, and determining a processing device that is to process the sensor data based on the priority.

Effects of the Invention

According to the present invention, it is possible to more efficiently use the resource of the server while the requirements on the sensor device are satisfied.

BRIEF DESCRIPTION OF DRAWINGS

FIG. 2 is a flowchart illustrating a flow of processing of an information processing device.

FIG. 3 is a diagram illustrating an example of a condition of a road where vehicles exist.

FIG. 4 is a diagram illustrating an example of a condition of another road where a vehicle exists.

DESCRIPTION OF EMBODIMENTS

[System Configuration]

Hereinafter, an embodiment of the present invention will be described with reference to the drawings.

Figure 1:
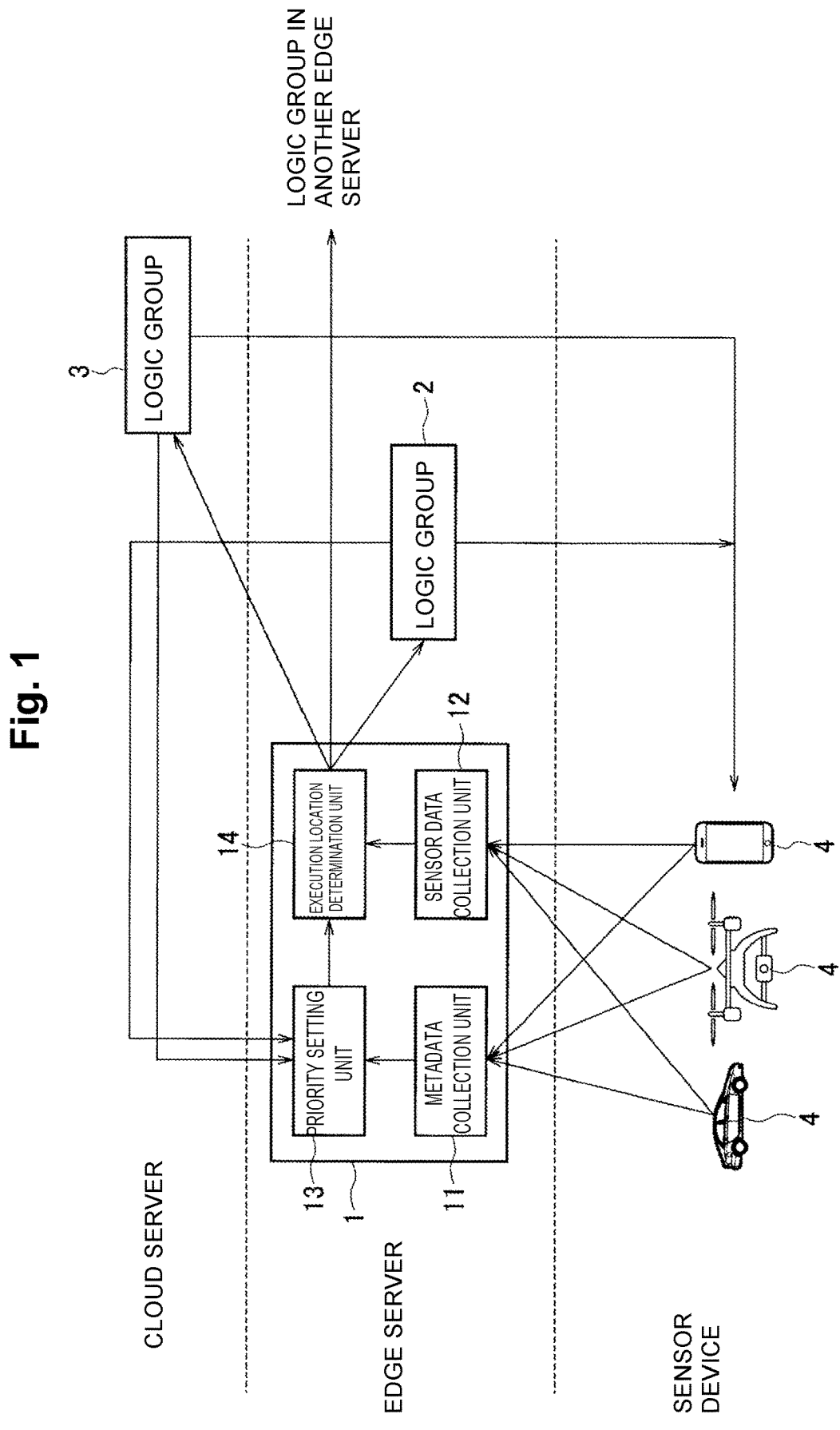
FIG. 1 is a diagram illustrating an example of a configuration of an information processing system of the present embodiment.

FIG. 1 is a diagram illustrating an example of a configuration of an information processing system of the present embodiment. The information processing system illustrated in FIG. 1 is composed of three layers including a sensor device, an edge server, and a cloud server. The edge server is arranged at each of sites in a surrounding part of a network. An information processing device 1 of the present embodiment is arranged in the vicinity of the edge server at each site. The edge server may include a function of the information processing device 1. A sensor device 4 is accommodated in a neighboring edge server and configured to perform communication via the edge server. It is noted that the configuration of FIG. 1 is an example, and a hierarchy of the information processing system is not limited to the three layers.

The sensor device 4 transmits sensor data measured by a sensor to the information processing device 1, and waits for a response. The sensor device 4 refers to an information device such as a camera, a microphone, a monitoring device for a road environment, and a sort of an IoT sensor for transport and other categories which are connected to the Internet, Low Power Wide Area (or Low Power Wide Area Network), or another communication network. Not only the sensor but also an automobile, a drone, and a sort of a device for communication such as a tablet or a smartphone on which various types of sensors are mounted are included. With regard to the sensor, when a case of an automobile connected to a network, that is, a connected car, will be considered, a camera installed for a purpose of navigation or monitoring of vehicles in front and in the rear, an anti-theft camera, and the like are exemplified as an on-board sensor. Also included are a monitoring sensor configured to detect an abnormal driving operation such as sudden turning of a steering wheel or sudden braking which has apparently occurred due to an emergency situation, various types of sensors configured to monitor an operation status of a sort of an in-vehicle device, and a sensor configured to detect information from an emergency report device or the like operated by a driver or an occupant. Meanwhile, a camera added to a road management facility or a transit and traffic monitoring device, a camera fitted to a vehicle, an aircraft, or the like operated for a traffic management purpose, and the like are also included as a non-on-board sensor configured to detect information of a surrounding environment of the automobile. The sensor data is data sensed by the sensor device 4, and is data set as an analysis target of the information processing system. The sensor data includes, for example, video information (a video signal) such as a still image or a motion image transmitted by the sensor, audio information (an audio signal), clock time information, and the like. The sensor data may be driving operation information such as sudden turning of the steering wheel or sudden braking which has apparently occurred due to an abnormal situation or an emergency situation, or information from a sort of the in-vehicle device. It is noted that any data format of the sensor may be adopted as long as the data format reflects sensor information, and either a text format or a binary format may also be adopted.

In addition, the sensor device 4 transmits metadata to the information processing device 1. The metadata is, for example, position information or attribute information of the sensor device 4. The position information may include not only information such as a latitude and a longitude but also information indicating an altitude, a movement speed, a movement direction, and an acceleration. The attribute information may include, in a case where the sensor device is a car, information related to a model year of a vehicle, on-board accessories, and the like.

The information processing device 1 receives the sensor data from the sensor device 4, and sets a priority for the sensor data based on a surrounding situation of the sensor device 4. The priority is an index indicating that arithmetic processing has a priority to be performed over other processing, and is an index indicating how early the arithmetic processing is to be performed on the information transmitted from the sensor device 4, and the information is to be sent to the sensor device or other transmission destinations. The surrounding situation of the sensor device 4 is comprehensively determined using at least any one of the metadata collected from a plurality of sensor devices 4, information of an environment where the sensor device 4 operates, and a past processing result of the sensor data.

The information processing device 1 dynamically determines, based on the priority, an execution location of a logic configured to process the sensor data, and transmits the sensor data to the determined execution location. In the present embodiment, the execution location of the logic includes a logic group 2 in the edge server and a logic group 3 in the cloud server. A logic group in another edge server may also be determined as the execution location of the logic.

The logic group 2 or 3 processes the sensor data, and returns a processing result to the sensor device 4. A communication delay in a response to a processing result of the sensor data in the cloud server is larger than a communication delay in a response to a processing result of the sensor data in the edge server. The sensor data in which a high priority has been set is caused to be processed by the logic group 2 in the edge server, and accordingly the processing result can be more promptly obtained. In a case where the processing of the sensor data does not demand promptness, a low priority is set for the sensor data, and the processing in the cloud server is allowed.

Next, a configuration example of the information processing device 1 will be described.

As illustrated in FIG. 1, the information processing device 1 includes a metadata collection unit 11, a sensor data collection unit 12, a priority setting unit 13, and an execution location determination unit 14.

The metadata collection unit 11 is configured to collect metadata from the sensor device 4.

The sensor data collection unit 12 is configured to receive the sensor data from the sensor device 4, and transmit the sensor data to the execution location determination unit 14.

The priority setting unit 13 is configured to set a processing priority for individual piece of sensor data received by the sensor data collection unit 12 based on a surrounding situation of the sensor device 4. The priority is determined by preparing a plurality of levels by referring to the estimated surrounding situation of the sensor device 4 which is comprehensively determined from the metadata or the environment information of the sensor device 4 or the like. The priority setting unit 13 may set the priority based on pieces of metadata of the plurality of sensor devices 4 which are collected by the metadata collection unit 11. The priority setting unit 13 may set the priority based on the information of the environment where the sensor device 4 operates such as map information or meteorological information. The priority setting unit 13 may set the priority based on a past processing result of the logic group 2 or 3. Any of throughput, an analysis completion time, resource usage, and a value of a performance requirement may be used as the past processing result of the logic group 2 or 3. In addition, in a case where the sensor data is a motion image and the logic group 2 or 3 is for object sensing, a type of a sensed object may be used as the past processing result, for example. In a case where the priority is to be set based on the past processing result, the priority setting unit 13 may receive a processing result from the logic group 2 or 3, and the processing result may be stored in the priority setting unit 13, a memory, or a storage in the edge server. The priority setting unit 13 may obtain environment information from the outside via the Internet. It is noted that in a case where the surrounding situation for determining the priority is not to be estimated, the priority setting unit 13 can assign a priority "high" with regard to this. Meanwhile, the priority setting unit 13 may reversely assign a priority "low" in such a case. An assignment method can be determined in advance according to the attribute information of the sensor.

The execution location determination unit 14 determines the logic group 2 or 3 that is to process the sensor data based on the priority set for the sensor data by the priority setting unit 13. The execution location determination unit 14 transmits the sensor data to the determined logic group 2 or 3, and causes the determined logic group to execute the processing of the sensor data.

[Operation]

Next, an operation of the information processing device 1 will be described with reference to a flowchart of FIG. 2. Processing of FIG. 2 is processing for the information processing device 1 to determine the logic group 2 or 3 that is to process the sensor data received from the sensor device 4.

In step S11, the priority setting unit 13 sets the priority for the sensor data based on the surrounding situation of the sensor device 4 that has transmitted the sensor data. A specific determination logic example for setting the priority will be described below.

In step S12, the execution location determination unit 14 determines whether the priority for the sensor data is high. A threshold to be set as a reference is determined in advance, for example. The execution location determination unit 14 determines that the priority is high if the priority is higher or equal to the threshold. Alternatively, the execution location determination unit 14 determines that the priority is low if the priority is lower than the threshold. This threshold may be set according to, for example, a load condition of the edge server, a processing time of the sensor data, a communication bandwidth between the edge server and the cloud server, or the like. The threshold may be set to be low when the edge server can afford the processing, and the execution location determination unit 14 may determine that the sensor data has high priority even if the sensor data does not have quite high priority.

In a case where the priority is high, in step S13, the execution location determination unit 14 transmits the sensor data to the logic group 2 in the edge server, and the sensor data is processed in the edge server.

In a case where the priority is low, in step S14, the execution location determination unit 14 transmits the sensor data to the logic group 3 in the cloud server, and the sensor data is processed in the cloud server.

The processing result of the sensor data in the logic group 2 or 3 is returned to the sensor device 4.

EXAMPLES

Hereinafter, while a connected car is used as an example of the sensor device 4, a description will be given regarding examples where a server that is to process the sensor data is determined. It is noted that the sensor device 4 is not intended to be limited to the connected car. A drone or a mobile terminal may be set as the sensor device 4, for example.

For a purpose of safe driving assist for automobiles, it is very useful to immediately share information about a falling object on a road, the presence of a wrong-way driving car, traffic accident information, traffic jam information, and the like between vehicles. Furthermore, by taking into account an internal state or a surrounding situation of each of the vehicles, for a vehicle having a high risk of occurrence of a traffic accident or a vehicle subjected to a large damage if an accident occurs, it is desirable that associated sensor data is to be preferentially processed, and information is to be provided earlier than others.

In examples described below, a scenario is assumed in which a vehicle (a sensor device 4) transmits an on-board camera image (sensor data) to a server (an information processing system), and the image is analyzed on the server to distribute an analysis result to surrounding vehicles. When the vehicle detects an object on a road from the on-board camera image, the vehicle transmits the on-board camera image to the server, and the server performs an analysis regarding a type and a risk of the object on the road to distribute an analysis result to vehicles in the surrounding of an observation spot, for example.

The information processing device 1 determines whether the sensor data is data to be preferentially processed depending on a surrounding situation of the vehicle. The sensor data that is to be preferentially processed is processed by the logic group 2 in the edge server, and the sensor data having a margin in terms of time is processed by the logic group 3 in the cloud server.

First Example/Obstruction Determination

It is useful, for avoiding a traffic accident, to immediately notify a relevant vehicle of an incident which has occurred at a blind spot for a driver. Here, a flow of processing for an obstruction determination will be described.

As a premise, all vehicles include an on-board camera, each of the vehicles is configured to periodically transmit metadata (including CAN data and position information) of its own vehicle to the information processing device 1. The information processing device 1 collects the position information of each vehicle, and also obtains and holds map information of the surrounding.

After a certain vehicle transmits the sensor data to the information processing device 1, the information processing device 1 estimates a shooting range of the on-board camera of each vehicle from a direction, a speed, position information, or camera information (such as a focal distance) of each vehicle from the metadata. With reference to this shooting range of each vehicle and map information, it is determined whether a vehicle travelling towards an observation spot in the vicinity of the observation spot (for example, in a range reachable in ten and several seconds) exists, and the observation spot is obstructed to become a blind spot for the vehicle. When the vehicle exists, the information processing device 1 sets the priority for processing the sensor data to be high, and the logic group 2 in the edge server is caused to process the sensor data. By the sensor data being processed by the logic group 2 in the edge server, a processing result can be distributed with a low latency. If the vehicle does not exist, the information processing device 1 sets the priority for processing the sensor data to be low, and causes the logic group 3 in the cloud server to process the sensor data.

Figure 3:
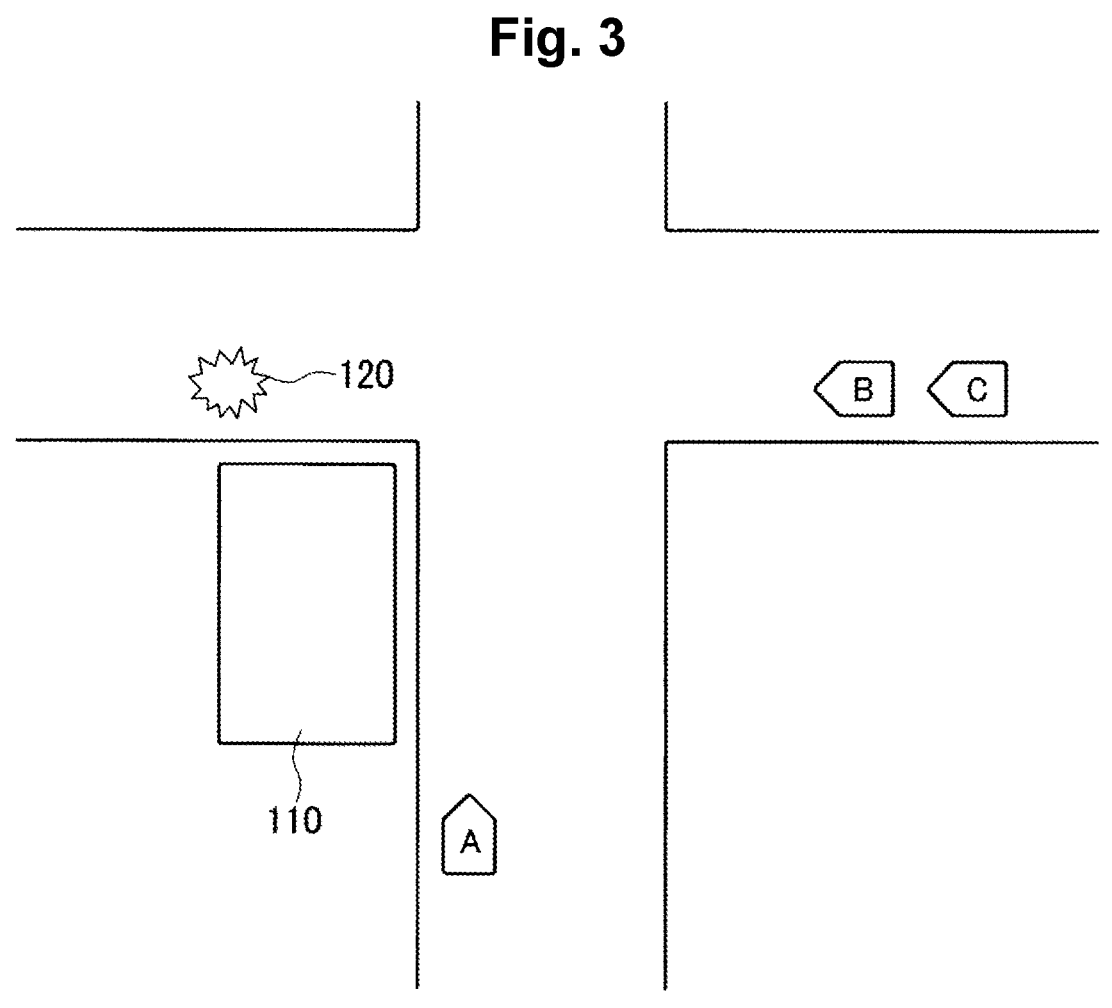

As an example, a situation illustrated in FIG. 3 will be considered. In FIG. 3, a road where a vehicle A travels intersects with a road where a vehicle B and a vehicle C travel. A falling object 120 is present after a junction of the road where the vehicle B travels. Since a building 110 is present, the falling object 120 may not be seen from the vehicle A. In addition, the falling object 120 may not be seen also from the vehicle C positioned behind the vehicle B.

The vehicle B transmits the sensor data to the information processing device 1. The observation spot of this sensor data is a road in a forward direction of the vehicle B (direction to the left in the drawing). The information processing device 1 determines whether there is a vehicle which travels in the vicinity of the observation spot and in which the observation spot is a blind spot. In the example of FIG. 3, the vehicle A is travelling towards a junction direction, and a road extending to the left from the junction is obstructed by the building 110. In addition, the vehicle C is also travelling towards the junction direction, and the falling object 120 is obstructed by the vehicle B. The information processing device 1 sets the priority for the sensor data from the vehicle B to be high, and causes the logic group 2 in the edge server to process the sensor data. The processing result is distributed to the vehicles A and C. The vehicle A performs the safe driving assist, such as prompting the driver to pay attention when necessary based on the distributed processing result.

Even if there is no risk for the vehicle B since a color of a traffic light ahead of the vehicle B is red and the vehicle B is stopping, the priority for the sensor data of the vehicle B is set to be high due to the situation of the vehicle A.

In a first example, there are a vehicle X configured to periodically transmit metadata and a vehicle Y configured to periodically transmit metadata and also transmit sensor data (a motion image of the on-board camera) in a non-periodic manner. It is assumed that a priority for the sensor data of the vehicle Y is calculated based on the metadata of a vehicle group relevant to the vehicle X. In other words, even among the sensor devices 4 of a same type, there are a sensor device 4 configured to transmit the metadata and also a sensor device 4 configured to transmit the sensor data instead of the metadata. Alternatively, there may be a sensor device 4 configured to transmit both the metadata and the sensor data. In the present invention, since the device has the sensor data collection unit 12 and the metadata collection unit 11 as components, the sensor devices 4 of the same type can be dealt with at the same time without distinguishing whether there is metadata to be transmitted or whether there is the sensor data to be transmitted.

Second Example/Consideration of Vehicle State

As an element affecting a risk of occurrence of a traffic accident, a state of a surrounding vehicle needs to be taken into account. In general, an operability and a stop ability of vehicles have been improved year by year due to an advance in technology, and the stop ability tends to be lower as a model year of the vehicle is older. In addition, it is considered that in the case of the same vehicle family and the same model year, a vehicle having a longer cumulative driving distance has a more severe deterioration over time.

In view of the above, before the analysis of the sensor data, with reference to the position information and the attribute information (such as CAN data) of the vehicle travelling in the surrounding of the observation spot, information on the oldest model year or the longest cumulative driving distance with regard to the vehicles existing in the vicinity of the observation spot is extracted.

In a case where a plurality of pieces of sensor data have arrived substantially at the same time, a higher priority is set for the sensor data in a direction where the surrounding vehicle having the older model year exists or the sensor data in a direction where the surrounding vehicle having the longer cumulative driving distance exists. In the estimation of the vehicle state, in addition to the model year or the cumulative driving distance, it is possible to take into account information such as the number of occupants in the vehicle, a load weight, a following distance, whether there is an installed autonomous driving control function, whether there is an installed safe driving assist function such as collision damage reducing braking, or an optional service subscription status of a manufacturer or the like when this information is usable.

Third Example/Consideration of State of Driver

As an element affecting the risk of the occurrence of the traffic accident, a state of the driver also needs to be taken into account. An avoidance behavior from the traffic accident largely relies on a driving skill of the driver, and a delay or an error in the driving operation may occur in a situation with accumulated fatigue.

In view of the above, before the analysis of the sensor data, with reference to the position information and the attribute information (such as CAN data) of the vehicle travelling in the surrounding of the observation spot, the number of times to perform sudden turning of the steering wheel or the number of times to perform sudden braking is counted per unit time for each vehicle, and a maximum value thereof is extracted. In addition, by referring to an elapsed time since start of an engine of each vehicle, a maximum value thereof is extracted.

In a case where a plurality of pieces of sensor data have arrived substantially at the same time, the sensor data in a direction where the surrounding vehicle with a higher number of times to perform sudden maneuvering exists or the sensor data in a direction where the surrounding vehicle with a longer elapsed time exists is preferentially dealt.

Fourth Example/Consideration of Surrounding Environment

As an element affecting the risk of the occurrence of the traffic accident, a surrounding environment such as a road surface condition or a meteorological condition also needs to be taken into account. A braking distance is increased at the time of snow coverage and road surface freeze, and a sight distance is decreased at the time of rainfall, snowfall, or dense fog, for example. In addition, the braking distance is increased if a road pavement is damaged, or a steel plate is laid for a road work. Furthermore, on a road with a narrow lane width, a vehicle is likely to run off an adjacent lane when a falling object on the road is to be avoided.

In view of the above, before the analysis of the sensor data, with reference to the position information and the environment information of the vehicle travelling in the surrounding, a determination is made on snow coverage/road surface freeze and rainfall/snowfall/dense fog, and it is determined whether no vehicle relevant to these situations exists in the vicinity of the observation spot. The environment information includes, for example, meteorological information, traffic information, a road surface condition in the vicinity of the travelling vehicle, fire information, and earthquake or other disaster information.

If the relevant vehicle exists, the priority for the sensor data analysis is set to be high. In the determination on snow coverage/road surface freeze, with reference to the attribute information (information on the number of rotations and speed of tires in the CAN data) of the vehicle, an actuation status of an anti-spin device or an anti-skid device may be analyzed. In addition, in the determination on rainfall/ snowfall/dense fog, an actuation status of a windscreen wiper or a fog lamp may be analyzed.

Fifth Example/Consideration of Damage Scale in Case of Accident

To realize maximum safe driving assist using a limited arithmetic resource and communication resource, by taking into account a supposed damage scale in case of an accident, an analysis of sensor data which may lead to avoidance of a major accident needs to be preferentially performed. An element affecting the damage scale of the traffic accident includes an environment factor. In a tunnel or on an elevated bridge, fire fighting for a vehicle fire is difficult, and the damage from the accident is likely to be expanded, for example. In addition, when a structural object such as a tunnel or an elevated bridge is damaged, transit restrictions will last for a long period of time, and therefore a social impact is also large.

In view of the above, before the analysis of the sensor data, with reference to the position information of the vehicle travelling in the surrounding and the map information, it is determined whether the observation spot is a tunnel or an elevated bridge and whether no vehicle exists. If the relevant vehicle exists, the priority for the sensor data analysis is set to be high.

In addition, another element affecting the damage scale of the traffic accident is a vehicle itself. A damage is likely to be expanded in case of an accident in a vehicle loaded with an inflammable material or a deleterious substance, for example.

In view of the above, before the analysis of the sensor data, with reference to the attribute information of the vehicle travelling in the surrounding, it is determined whether no oil tanker or the like exists in a neighborhood. If the relevant vehicle exists, the priority for the sensor data analysis is set to be high.

Sixth Example/Consideration of Response Content

For a purpose of distribution of information related to an obstacle to road traffic such as a falling object on a road, a car parked on a street, a traffic accident, or traffic jam to the surrounding vehicles, a required level of the low latency largely differs depending on a type of the obstacle.

In a case where a wrong-way driving vehicle on a motorway is sensed, there is a high risk of occurrence of a fatal accident caused by a front collision with a vehicle behind, and since a relative speed is high, a time margin is extremely short, several seconds, for example. In addition, in a case where rockfall is sensed on a mountain road, since rockfall may successively occur, information distribution in several tens of seconds is desired. Meanwhile, a delay in minutes is tolerable in the information distribution for an object that is not moving such as a car parked on the street.

In view of the above, before the analysis of the sensor data, with reference to information of an obstacle sensed at the same spot in the past, a priority is assigned to the processing according to a risk thereof.

Figure 4:
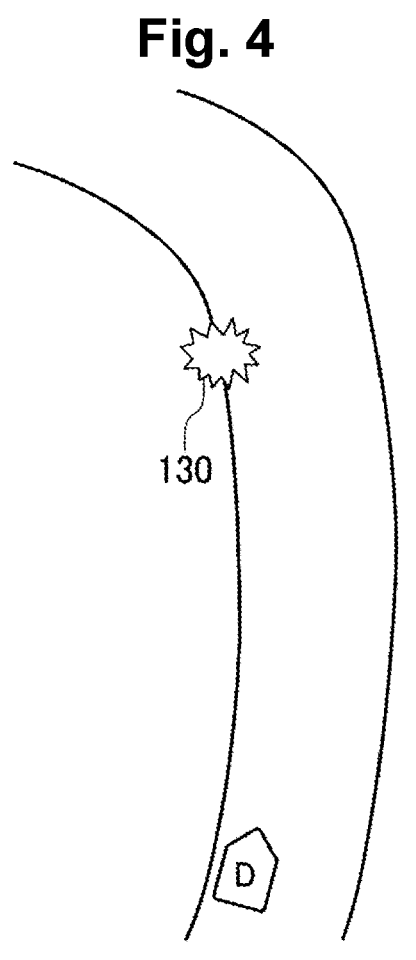

As illustrated in FIG. 4, in a case where it is understood from a processing result of sensor data transmitted by a vehicle D that a falling rock 130 exists ahead, this processing result is fed back to the information processing device 1, for example. After that, the information processing device 1 sets a high priority for the sensor data received from the vehicle travelling in the vicinity of the observation spot.

As described above, the information processing device 1 of the present embodiment includes the sensor data collection unit 12 configured to receive the sensor data from the sensor device 4, the priority setting unit 13 configured to set the priority for the sensor data based on the surrounding situation of the sensor device 4 when the sensor data is received, and the execution location determination unit 14 configured to determine the logic group 2 or 3 that is to process the sensor data based on the priority. With this configuration, in a case where the promptness is not required for the processing of the sensor data, the processing of the sensor data by the logic group 3 in the cloud server is allowed. In a case where the promptness is required for the processing of the sensor data, the processing of the sensor data is executed by the logic group 2 in the edge server. Accordingly, the resource of the edge server can be more efficiently used.

Figure 5:
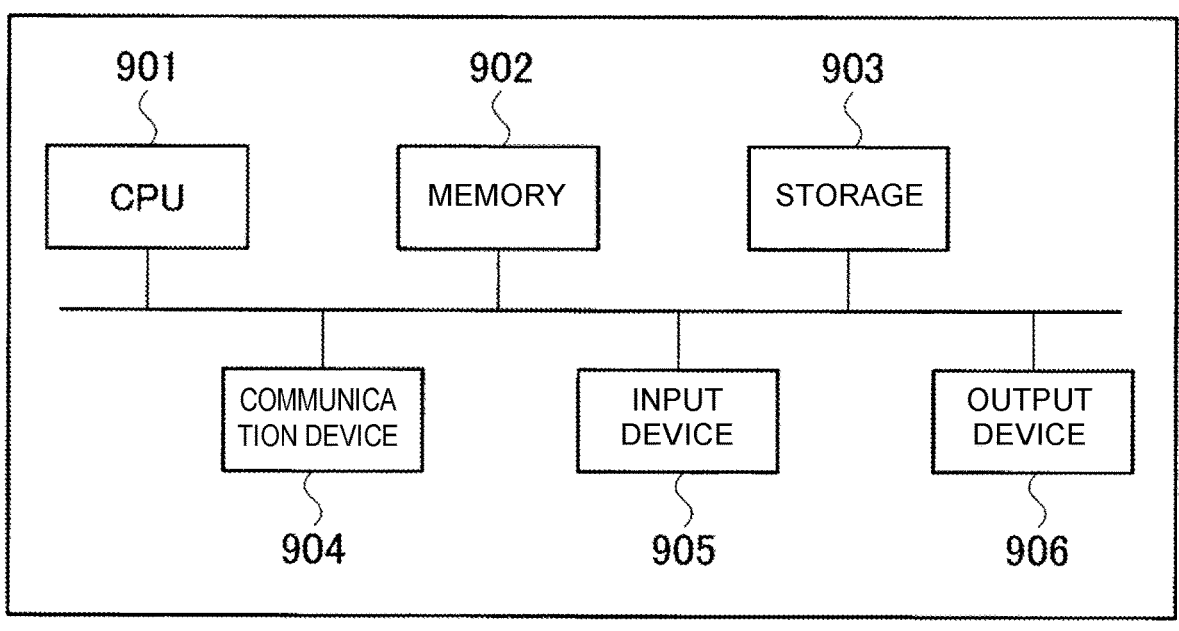
FIG. 5 is a diagram illustrating an example of a hardware configuration of the information processing device.

A general purpose computer system including a central processing unit (CPU) 901, a memory 902, a storage 903, a communication device 904, an input device 905, and an output device 906 as illustrated in FIG. 5, for example, can be used as the information processing device 1 described above. In this computer system, when the CPU 901 executes a predetermined program loaded onto the memory 902, the information processing device 1 is realized. This program can be recorded on a computer readable recording medium such as a magnetic disc, an optical disc, or a semiconductor memory, or can also be distributed via a network.

REFERENCE SIGNS LIST

1 Information processing device
11 Metadata collection unit
12 Sensor data collection unit
13 Priority setting unit
14 Execution location determination unit
2, 3 Logic group
4 Sensor device

The invention claimed is:

1. An information processing device, comprising:
a sensor data collection unit, including one or more processors, configured to receive sensor data from a plurality of separate sensor devices, the sensor data being measured by the sensor device;
a metadata collection unit, including one or more processors, configured to collect metadata from the plurality of separate sensor devices separately from the sensor data, the metadata including attribute information of the plurality of sensor devices;
a priority setting unit, including one or more processors, configured to set, when the sensor data is received, a priority for the sensor data based on a surrounding situation of each sensor device determined using the metadata, information on an environment where the sensor device operates, or a past processing result of the sensor data;
an execution location determination unit, including one or more processors, configured to determine a logic group among a plurality of logic groups based on the priority; and
a transmitter to transmit the sensor data to the determined logic group,
wherein each of the plurality of logic groups is located on a separate device and processes the sensor data,
wherein the devices on which the logic groups are located are placed in different locations,
wherein the determining of the logic group comprises:
determining the logic group to be an edge server arranged in a surrounding part of a network when the priority of the sensor data is higher than a threshold, and
determining the logic group to be a cloud server when the priority of the sensor data is lower than or equal to the threshold,
wherein the threshold is set dynamically based on a load condition of the edge server, and wherein a delay in a response to a processing result of the sensor data in the cloud server is greater than a delay in a response to a processing result of the sensor data in the edge server.

2. The information processing device according to claim 1, wherein the plurality of sensor devices are accommodated in the edge server.

3. The information processing device according to claim 1, wherein the sensor data from at least one of the plurality of sensor devices, which is preferentially processed based on the set priority, is processed by the determined logic group and is transmitted to one or more other sensor devices of the plurality of sensor devices.

4. The information processing device according to claim 1, wherein the plurality of sensor devices are different vehicles driving on a road, and the prioritization of the sensor data is based on whether an object on the road is detected by one of the plurality of sensor devices, the prioritization of the sensor data based on whether the object on the road is detected includes:

prioritizing one of the sensor devices that can directly see the object on the road.

5. The information processing device according to claim 1, wherein the plurality of sensor devices are different vehicles driving on a road, and the prioritization of the sensor data is based on attribute information including a model year, the prioritization of the sensor data based on the attribute information includes:

setting a higher priority for sensor data in a direction where a surrounding vehicle having an older model year exists.

6. An information processing method, comprising:

receiving, by an information processing device, sensor data from a plurality of separate sensor devices, the sensor data being measured by the plurality of sensor devices;

collecting, by the information processing device, metadata from the plurality of sensor devices separately from the sensor data, the metadata including attribute information of the plurality of sensor devices;

setting, by the information processing device, when the sensor data is received, a priority for the sensor data based on a surrounding situation of each sensor device determined using the metadata, information on an environment where the sensor device operates, or a past processing result of the sensor data;

determining, by the information processing device, a logic group among a plurality of logic groups to process the sensor data based on the priority; and transmitting, by the information processing device, the sensor data to the determined logic group;

wherein each of the plurality of logic groups is located on a separate device and processes the sensor data, wherein the devices on which the logic groups are located are placed in different locations, wherein the determining of the logic group comprises:

determining the logic group to be an edge server arranged in a surrounding part of a network when the priority of the sensor data is higher than a threshold, and determining the logic group to be a cloud server when the priority of the sensor data is lower than or equal to the threshold, wherein the threshold is set dynamically based on a load condition of the edge server, and wherein a delay in a response to a processing result of the sensor data in the cloud server is greater than a delay in a response to a processing result of the sensor data in the edge server.

7. The information processing method according to claim 6, wherein the plurality of sensor devices are accommodated in the edge server.

8. The information processing method according to claim 6, wherein the plurality of sensor devices are different vehicles driving on a road, and the prioritization of the sensor data is based on whether an object on the road is detected by one of the plurality of sensor devices, the prioritization of the sensor data based on whether the object on the road is detected includes:

prioritizing one of the sensor devices that can directly see the object on the road.

9. A non-transitory computer-readable storage medium storing computer executable instructions which, when executed by a computer, cause the computer to:

receive sensor data from a plurality of sensor devices, the sensor data being measured by the plurality of sensor devices;

collect metadata from the plurality of separate sensor devices separately from the sensor data, the metadata including attribute information of the plurality of sensor devices;

set, when the sensor data is received, a priority for the sensor data based on a surrounding situation of each sensor device determined using the metadata, information on an environment where the sensor device operates, or a past processing result of the sensor data;

determine a logic group among a plurality of logic groups to process the sensor data based on the priority; and transmit the sensor data to the determined logic group;

wherein each of the plurality of logic groups is located on a separate device and processes the sensor data, wherein the devices on which the logic groups are located are placed in different locations, wherein the determining of the logic group comprises:

determining the logic group to be an edge server arranged in a surrounding part of a network when the priority of the sensor data is higher than a threshold, and determining the logic group to be a cloud server when the priority of the sensor data is lower than or equal to the threshold, wherein the threshold is set dynamically based on a load condition of the edge server, and wherein a delay in a response to a processing result of the sensor data in the cloud server is greater than a delay in a response to a processing result of the sensor data in the edge server.

10. The non-transitory computer-readable storage medium to claim 9, wherein the plurality of sensor devices are different vehicles driving on a road, and the prioritization of the sensor data is based on whether an object on the road is detected by one of the plurality of sensor devices, the prioritization of the sensor data based on whether the object on the road is detected includes:

prioritizing one of the sensor devices that can directly see the object on the road.

11. An information processing device, comprising:

a sensor data collection unit, including one or more processors, configured to receive sensor data from a plurality of separate sensor devices, the sensor data being measured by the plurality of sensor devices;

a metadata collection unit, including one or more processors, configured to collect metadata from the plurality of sensor devices separately from the sensor data, the metadata including attribute information of the plurality of sensor devices;

a priority setting unit, including one or more processors, configured to set, when the sensor data is received, a priority for the sensor data based on a surrounding situation of each sensor determined using the metadata, information on an environment where the sensor device operates, or a past processing result of the sensor data; and a transmitter to transmit the sensor data to a logic group among a plurality of logic groups based on the priority of the sensor data and a processing speed of the logic group to process the sensor data such that a higher priority of the sensor data corresponds to a higher processing speed of the logic group, wherein each of the plurality of logic groups is located on a separate device and processes the sensor data, wherein the devices on which the logic groups are located are placed in different locations, wherein the determining of the logic group comprises:

determining the logic group to be an edge server arranged in a surrounding part of a network when the priority of the sensor data is higher than a threshold, and determining the logic group to be a cloud server when the priority of the sensor data is lower than or equal to the threshold, wherein the threshold is set dynamically based on a load condition of the edge server, and wherein a delay in a response to a processing result of the sensor data in the cloud server is greater than a delay in a response to a processing result of the sensor data in the edge server.

12. The information processing device according to claim 11, wherein the plurality of sensor devices are different vehicles driving on a road, and the prioritization of the sensor data is based on whether an object on the road is detected by one of the plurality of sensor devices, the prioritization of the sensor data based on whether the object on the road is detected includes:

prioritizing one of the sensor devices that can directly see the object on the road.

* * * * *